(No Model.) 2 Sheets—Sheet 1.

J. A. SEELY & C. E. SCRIBNER.
CIRCUIT FOR MULTIPLE SWITCHBOARD SYSTEMS OF TELEPHONE EXCHANGES.

No. 472,772. Patented Apr. 12, 1892.

Witnesses.
Saml. B. Dover.
Wm. M. Giller.

Inventors.
John A. Seely.
Charles E. Scribner.
By George P. Barton
Att'y (No Model.) 2 Sheets—Sheet 2.

J. A. SEELY & C. E. SCRIBNER.
CIRCUIT FOR MULTIPLE SWITCHBOARD SYSTEMS OF TELEPHONE EXCHANGES.

No. 472,772. Patented Apr. 12, 1892.

Witnesses.
Saml. B. Dover.
Wm. M. Giller.

Inventors:
John A Seely
Charles E Scribner.
By George P Barton
Att'y.

UNITED STATES PATENT OFFICE.

JOHN A. SEELY, OF NEW YORK, N. Y., AND CHARLES E. SCRIBNER, OF CHICAGO, ILLINOIS, ASSIGNORS TO THE WESTERN ELECTRIC COMPANY, OF CHICAGO, ILLINOIS.

CIRCUIT FOR MULTIPLE-SWITCHBOARD SYSTEMS OF TELEPHONE-EXCHANGES.

SPECIFICATION forming part of Letters Patent No. 472,772, dated April 12, 1892.

Application filed November 15, 1886. Serial No. 218,951. (No model.)

*To all whom it may concern:*

Be it known that we, JOHN A. SEELY, residing at the city of New York, in the county and State of New York, and CHARLES E. SCRIBNER, residing at Chicago, in the county of Cook and State of Illinois, both citizens of the United States, have invented a certain new and useful Improvement in Circuits for Multiple-Switchboard Systems of Telephone-Exchanges, of which the following is a full, clear, concise, and exact description, reference being had to the accompanying drawings, forming a part of this specification.

Our invention relates to the circuits of the telephone-lines and the test-wires of multiple-switchboard systems of telephone-exchanges. In large exchanges where several thousand subscribers are connected with the same switchboards it is found desirable to provide for metallic circuits and ground-circuits for different subscribers connected with the same boards and uniform tests for determining at one board whether any line called for (whether metallic or single) is in use at any other board. We have been able to accomplish these results by the use of the circuits which we have invented. The connections upon the switchboards are the same for the metallic circuits as for the single or ground circuits, and any single-circuit line may be changed to a metallic circuit without in any manner disturbing or changing the connections upon the switchboard. It is well known in the art that metallic circuits possess certain advantages over ground-circuits, the principal advantage being that cross-talk is almost wholly obviated by the use of metallic circuits, in which the different limbs of each circuit are placed near each other. It is evident that single circuits are cheaper and less complicated than metallic circuits, and therefore they are generally used in exchanges where the telephone-lines are limited in number.

Our invention will be readily understood by reference to the accompanying drawings, in which—

Figure 1:
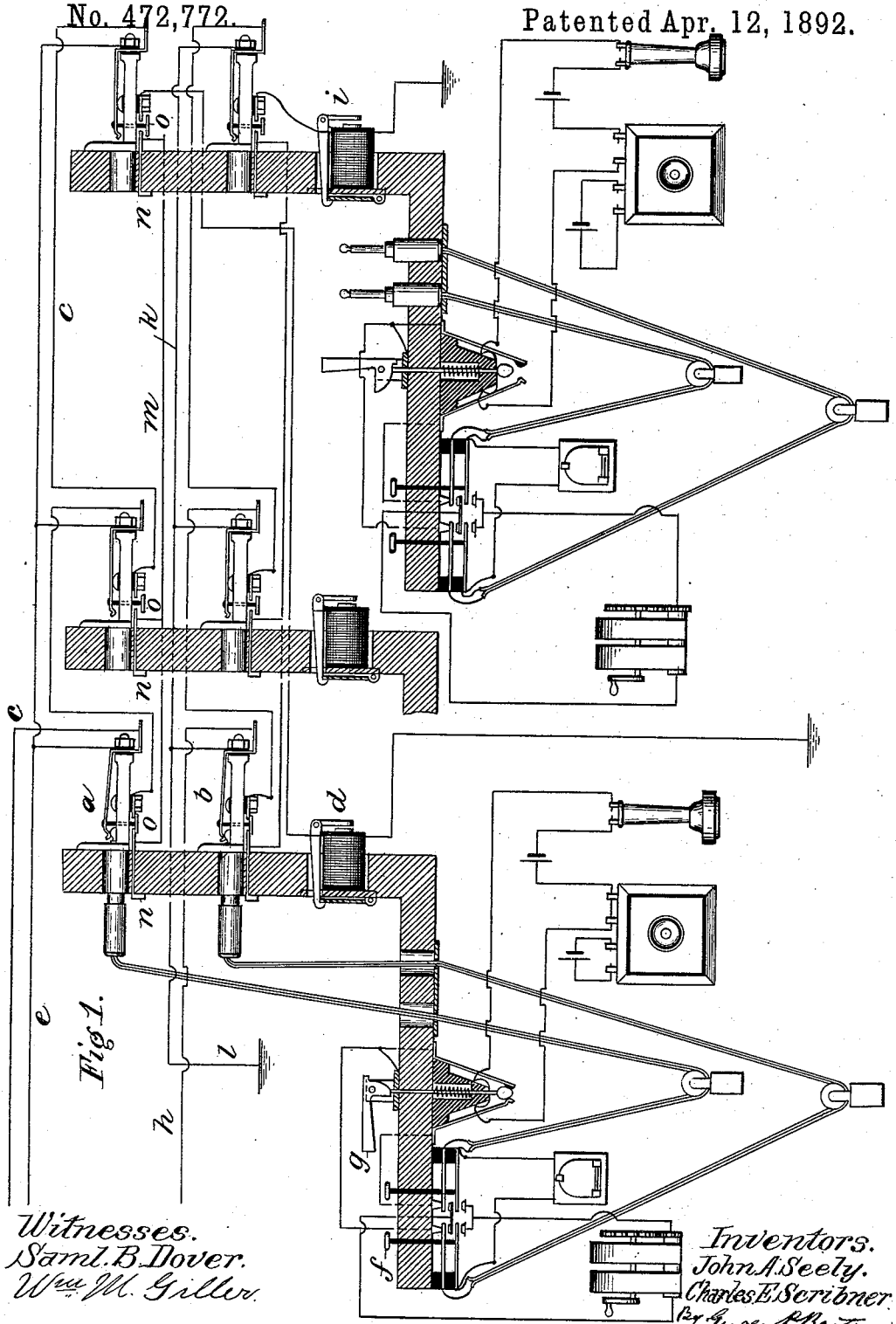
Figure 2:
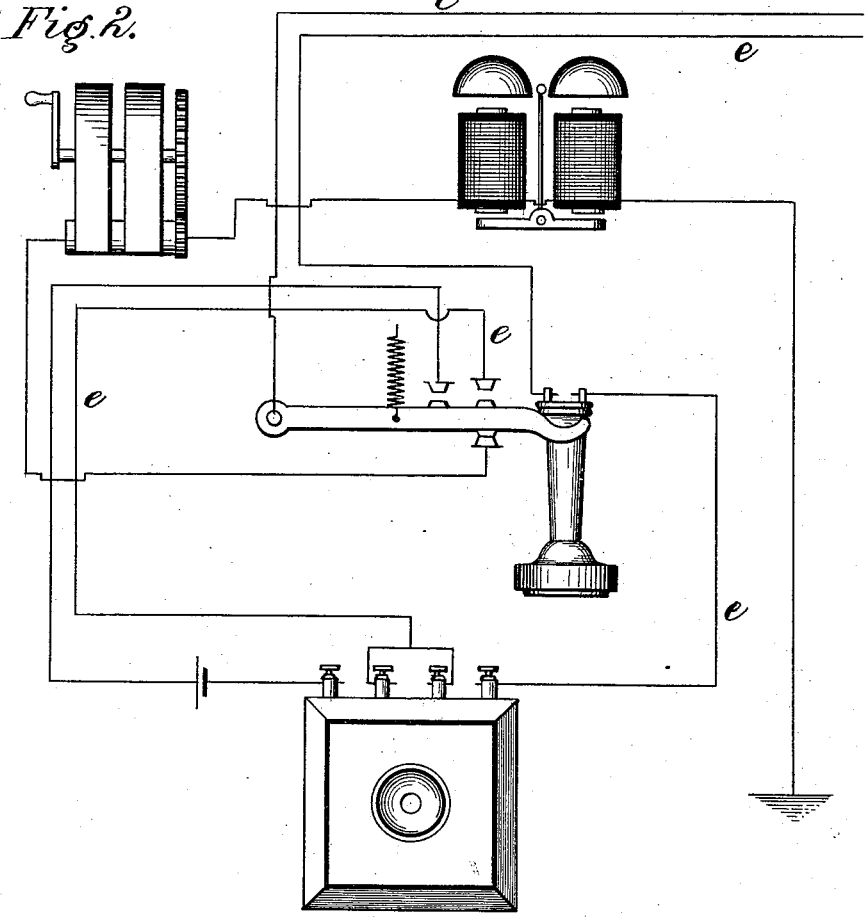
Figure 3:
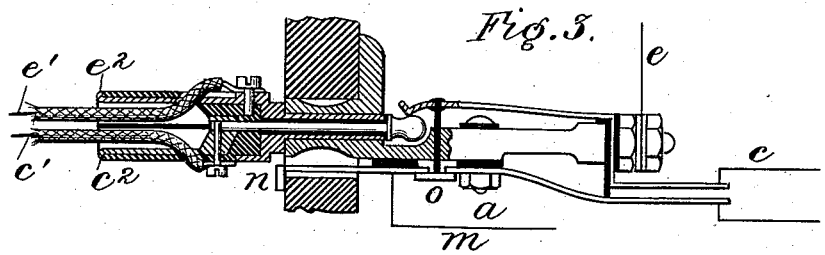

Figure 1 is a diagram illustrative of the circuits which we have invented at the central office. Fig. 2 is a diagram illustrative of the circuits of a subscriber provided with a metallic circuit. Fig. 3 is a sectional view of our loop-plug inserted in our spring-jack.

Like parts are indicated by similar letters of reference throughout the different figures.

Referring now to Fig. 1 it will be seen that at the first board a pair of loop-plugs are shown inserted in spring-jack switches $a$ and $b$, respectively. The metallic circuit of the station shown in Fig. 2 is connected with spring-jack $a$. As shown in Fig. 2, the subscriber's telephone is hung upon the telephone-switch and the limb $c$ of the metallic circuit is permanently connected with the switch. The generator and bell are connected in the circuit of this limb of the metallic circuit when the telephone is hung upon the telephone-switch, as shown in Fig. 2. When thus connected, it is evident that the subscriber on turning his generator sends current from ground at his station over limb $c$ to the central office. This limb $c$ is normally connected through the springs of the spring-jack switches of the line and through the individual annunciator $d$ to ground. Thus the subscriber on turning his generator throws down the shutter $d$ and notifies the central office of his call. The circuit over which this calling-signal is sent is limb $c$, which is connected to ground at the subscriber's station and to ground at the central office, and so for the time being is used as a ground-circuit. The other limb $e$ of the metallic circuit is normally disconnected from the telephone-switch lever at the subscriber's station. This limb $e$ may be traced from its open contact-point near the telephone-switch, as shown in Fig. 2, through the telephone to the insulated frame of switch $a$, and in like manner to the insulated frames or tubes of the other switches of the line upon different switchboards. Limb $e$ is thus normally an open wire—that is, normally it has no connection with ground at any point. The subscriber, however, having sent current over limb $c$, as before described, and thrown down his shutter at once takes his telephone from the telephone-switch lever, whereupon the switch-lever closes upon the contact-point of limb $e$. The normal ground at the subscriber's station is thus at once taken off and the limbs $e$ $c$ are united at the subscriber's station, bringing the telephone into the metallic circuit thus formed. The operator at the central office having seen the shutter $d$ fall at once inserts a plug in switch $a$, as shown in Fig. 1. The plug, being thus inserted, loops the operator's telephone into the metallic circuit.

The keyboard apparatus which we have shown, while novel in design, was not devised by us jointly, but will be claimed in separate applications to be made by us in accordance with our respective interests. We shall therefore only describe the keyboard apparatus herein to the extent necessary to make clear the mode of operation of our joint system.

The plug being inserted in spring-jack $a$, as before stated, loops the operator's telephone outfit into the circuit, and the operator, listening, finds out what connection is wanted. We will suppose that the calling subscriber asks for a connection with the line connected with switch $b$. The operator will at once pick up the other plug of the pair, the first having been inserted in switch $a$, as before described, and insert said plug in switch $b$, as shown. Then by means of loop-key $f$ the generator is looped into the circuit of the line of the subscriber wanted, thus notifying the subscriber wanted of the call. The operator thereupon throws down his cam-lever $g$ to the position shown, thus disconnecting his telephone from the circuit. The ground telephone-circuit $h$ is connected at the subscriber's station in the usual manner with the usual subscriber's apparatus and extends to the central office, and at the central office is connected through its series of switches on the different multiple switchboards and through its individual annunciator $i$ to ground in the usual manner. Wire $k$ is connected with the insulated frames or tubes of the different switches of line $h$, as shown, and is provided with a ground $l$ at the central office. Line $k$ is connected to the insulated frames or tubes of the switches of line $h$ in the same manner that the limb $e$ is connected with the switches of line $c$. Line $k$, however, runs to ground at the central office, while limb $e$ extends to the subscriber's station, as before described.

In order that the connections between the lines may be more clearly understood, we will describe Fig. 3 somewhat in detail: The plug being inserted in the spring-jack $a$, the point of the plug, and hence strand $c'$ of the cord, is connected to the spring or lever of the switch. The insulated sleeve upon the shank of the plug impinges against the insulated frame or tube, and thus strand $e'$ of the cord is connected with said insulated frame or tube. Therefore when a loop-plug is inserted one limb of the metallic circuit is connected with the point of the plug and thence to one strand of the cord, while the other limb is connected with the sleeve or other contact-point of the plug, and hence to the other strand. Tracing the circuits in this manner through the strands of the flexible cord from switch $a$ to switch $b$, we shall find corresponding connections at switch $b$. The circuits of two subscribers thus connected may be traced over the second subscriber's line $h$ to the lever of switch $b$, the tip of the plug in contact therewith through a strand of the cord to the tip of the other plug and to the spring of switch $a$, thence by line $c$ to the first subscriber's station, and back over limb $e$ to the frame of switch $a$. The frame of switch $a$ is connected with the frame of switch $b$ through the sleeves upon the plugs and the strand $e'$ of the cord. The frame of switch $b$ is connected with ground $l$ by wire $k$, and hence the circuit of the two connected subscribers finds ground at $l$. It will be seen that if line $k$, instead of passing to ground at $l$, were continued to the subscriber's station of line $h$ and there connected in the manner illustrated in Fig. 2 with respect to wire $e$, the two stations would be connected together with complete metallic circuits. It is also evident that if the limb $e$ of the metallic circuit of the first subscriber were connected to ground at the central office the connections between the two subscribers might be made just the same upon the switchboard.

We have hereinbefore described the circuits of the telephone-lines and shown how a metallic circuit may be united with a metallic circuit to connect two subscribers, how a metallic circuit-line may be connected with a ground-circuit line, and a ground-circuit line with another ground-circuit line, all by the same switching apparatus upon the switchboard.

We will now describe the test-circuits, by means of which we are enabled to determine at any given board whether a line called for is in use at any other board. These test-circuits we have designed for use in connection with both metallic circuits and ground-circuits when used upon the same switchboards at the same central office. The test-pieces $n$ are provided near the spring-jacks of line $c$ upon the different boards, as shown, and a test circuit or wire is connected with the test-pieces of each line, so that each circuit is provided with a test-wire, which is connected with a test-piece upon each of the switchboards. A key $o$ is provided on each of the spring-jacks, and when a plug is inserted in any spring-jack the key upon said spring-jack is closed, so that the test-circuit of a line is connected with the ground-point of the switch at the same time the lever of the spring-jack is lifted from said ground-contact. This key $o$ will be readily understood by reference to Fig. 3, in which the plug is shown inserted and the key closed. Test-point $n$ is thus connected with the ground-contact of switch $b$. As all the test-pieces of the line are connected together by line $m$, it is evident that when a test is applied at any of the boards to a test-plate $n$ the ground will be indicated. Thus it may be determined that the line is in use.

If the line is not in use, the test-wire $m$ will be found open when the test is applied and the operator will know that the line is free. The operation of this test-circuit is the same whether used in connection with metallic circuits or ground-circuits or any combination of ground-circuits and metallic circuits.

It should be observed that the two strands $e'$ $c'$ of the cords are respectively connected to metallic pieces $e^2$ $c^2$ upon the heel of the plug, and when the plugs rest in their sockets these pieces are connected together by the metallic plates upon which they rest. This connection is to complete the circuit through the operator's telephone when one plug is inserted in a spring-jack and the other is resting in a socket, so that the operator may converse with the subscriber in whose spring-jack the plug is inserted.

Having thus described our invention, we claim as new and desire to secure by Letters Patent—

1. In a multiple-switchboard system of a telephone-exchange, a metallic circuit, one limb of which is connected normally at the subscriber's station through switch, generator, and bell to ground and at the central office with its switches on two or more multiple switchboards and through an individual annunciator to ground and the other limb of said circuit consisting of a wire $e$, normally open at the subscriber's station and connected at the central office with the insulated tubes or frames of the spring-jacks of the line, in combination with a test-wire $m$, connected with test-pieces $n$ near the different spring-jacks, keys $o$ upon said spring-jacks, and switching apparatus, substantially as shown and described.

2. In a multiple-switchboard system, the combination of switches, one switch upon each board, with wires $c$ $e$, forming the two limbs of a metallic circuit, the test-wire $m$, a branch wire to ground, including annunciator $d$ at the central office, and the loop-plug whereby the two limbs may be connected with the different points of the plug and the test-wire connected with the ground branch.

In witness whereof we hereunto subscribe our names.

JOHN A. SEELY.
CHARLES E. SCRIBNER.

Witnesses to John A. Seely:
H. B. THAYER,
A. L. SAER.

Witnesses to Charles E. Scribner:
GEORGE P. BARTON,
WM. M. GILLER.